(12) United States Patent
Matalon et al.

(10) Patent No.: US 11,236,833 B2
(45) Date of Patent: Feb. 1, 2022

(54) DIAPHRAGM VALVE WITH PLASTIC DIAPHRAGM

(71) Applicants: Louis E. Matalon, Lancaster, PA (US); Richard Kovacs, Lancaster, PA (US)

(72) Inventors: Louis E. Matalon, Lancaster, PA (US); Richard Kovacs, Lancaster, PA (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 16/912,864

(22) Filed: Jun. 26, 2020

(65) Prior Publication Data

US 2021/0404563 A1     Dec. 30, 2021

(51) Int. Cl.
*F16K 7/12* (2006.01)
*F16K 1/226* (2006.01)
*F16K 1/44* (2006.01)

(52) U.S. Cl.
CPC ............ *F16K 7/126* (2013.01); *F16K 1/2266* (2013.01); *F16K 1/443* (2013.01)

(58) Field of Classification Search
CPC ......... F16K 7/126; F16K 1/443; F16K 1/2266
USPC .............................................. 251/331, 335.2
See application file for complete search history.

(56) References Cited

U.S. PATENT DOCUMENTS

| | | | | |
|---|---|---|---|---|
| 2,725,211 A * | 11/1955 | Boteler | .................. | F16K 7/126 251/77 |
| 3,134,571 A * | 5/1964 | Boteler | .................. | F16K 7/126 251/331 |
| 5,151,178 A * | 9/1992 | Nickerson | .............. | G01N 30/08 210/137 |
| 6,007,045 A * | 12/1999 | Heiniger | ................. | F16K 7/126 251/331 |
| 9,016,307 B2 * | 4/2015 | Matalon | .............. | F16K 27/0236 137/315.05 |
| 9,322,482 B2 * | 4/2016 | Matalon | .................. | F16K 7/126 |
| 9,366,346 B2 | 6/2016 | Matalon et al. | | |
| 10,145,443 B2 | 12/2018 | Kudla et al. | | |
| 2011/0031427 A1 * | 2/2011 | Sitnikov | ................. | F16K 7/126 251/335.2 |
| 2012/0056120 A1 * | 3/2012 | Hunnekuhl | ............. | F16K 7/126 251/331 |
| 2014/0021392 A1 | 1/2014 | Matalon | | |
| 2014/0061525 A1 * | 3/2014 | Matalon | .................. | F16K 7/126 251/331 |

OTHER PUBLICATIONS https://www.itt.com/newsroom/news-releases/2014/itt-launches-pure-flo%C2%AE-envizion%E2%84%A2-hygienic-diaphrag.
(Continued)

*Primary Examiner* — John Bastianelli
(74) *Attorney, Agent, or Firm* — Hertzburg, Turk & Associates, LLC

(57) ABSTRACT

Diaphragm valves include plastic diaphragm and reduced or no elastomer backing cushion, where peripheral or all sealing forces may be applied directly to the diaphragm of the valve assembly. The valve assemblies may include a pressure ring to apply sealing force to a surface of the diaphragm with a reduced size or no backing cushion allowing a two-fold or more increase in pressure capacity of the valve assembly. An elastomer or metallic spring placed above a center diaphragm boss may provide center-to-edge compliance for passage seal.

14 Claims, 16 Drawing Sheets

(56) References Cited

OTHER PUBLICATIONS https://www.engvalves.com/en-US/Products/List/?t=Brand&q=138.
International Search Report and Written Opinion for International Application No. PCT/US21/36517 dated Jul. 20, 2021, pp. 8.

* cited by examiner

DIAPHRAGM VALVE WITH PLASTIC DIAPHRAGM

BACKGROUND

Unless otherwise indicated herein, the materials described in this section are not prior art to the claims in this application and are not admitted as prior art by inclusion in this section.

Diaphragm valves (or membrane valves) include of a valve body with two or more ports, a diaphragm, and a weir or seat upon which the diaphragm seals closing the valve. A peripheral seal of the diaphragm (sealing the valve assembly to prevent external leakage) and the weir seal rely on elastomer compliance of the sealing components. The peripheral seal may also depend on an elastomer spring loading to adjust for thermal expansion and contraction of the valve assembly.

SUMMARY

The present disclosure generally describes diaphragm valves with plastic diaphragm and reduced or no elastomer backing cushion, where peripheral or all sealing forces may be applied directly to the diaphragm of the valve assembly.

According to some examples, a diaphragm valve assembly may include a valve body having an inner wall, a first port defined by a first portion of the inner wall, a second port defined by a second portion of the inner wall, and a controllable flow path defined by a third portion of the inner wall between the first port and the second port; a plastic diaphragm positioned over an opening along the third portion of the inner wall, the diaphragm configured to provide a peripheral seal along a periphery of the opening and a passage seal along a diametric weir within the opening; a pressure ring in contact with a peripheral surface of the diaphragm configured to provide a pressure load to the diaphragm to provide the peripheral seal; an elastic reduced backing cushion that is substantially ring-shaped and configured to be fitted over the diaphragm within the pressure ring; a compressor within the pressure ring and in partial contact with the reduced backing cushion, the compressor configured to selectively engage a center portion of the diaphragm effective to form the passage seal; and a spindle coupled to the compressor, where the spindle is configured to actuate a position of the compressor between a closed position and an open position such that the diaphragm forms the passage seal in the closed position or releases the passage seal in the open position.

According to other examples, the diaphragm valve assembly may include a handwheel configured to actuate a position of the spindle between the open position and the closed position; and a bonnet to house the pressure ring, the compressor, and the spindle. The diaphragm valve assembly may further include a cover to be fitted over an upper portion of the bonnet and slideably coupled to the handwheel, where the cover comprises threads on an inner surface that match corresponding threads on an outer surface of the bonnet, and the cover is configured to enable the handwheel to be rotated in order to actuate the position of the spindle. The diaphragm valve assembly may also include a plurality of pins configured to receive pressure load from the cover; a load plate positioned in contact with the plurality of pins and configured to receive the pressure load from the plurality of pins; and one or more springs positioned in contact with the load plate and configured to receive the load pressure from the load plate; and provide peripheral sealing thrust to the pressure ring.

According to further examples, the diaphragm valve assembly may further include a diaphragm stud mechanically coupled to the compressor and inserted into a center portion of the diaphragm in order to engage the diaphragm when releasing the passage seal based on a reverse thrust from the compressor. The center portion of the diaphragm may be a raised diaphragm boss and the reduced backing cushion may be configured to fit around the diaphragm boss.

According to some examples, a diaphragm valve assembly may include a valve body having an inner wall, a first port defined by a first portion of the inner wall, a second port defined by a second portion of the inner wall, and a controllable flow path defined by a third portion of the inner wall between the first port and the second port; a plastic diaphragm positioned over an opening along the third portion of the inner wall, the diaphragm configured to provide a peripheral seal along a periphery of the opening and a passage seal along a diametric weir within the opening; a pressure ring in contact with a peripheral surface of the diaphragm configured to provide a pressure load to the diaphragm to provide the peripheral seal; a compressor within the pressure ring and in contact with the diaphragm, the compressor configured to selectively engage a center portion of the diaphragm effective to form the passage seal; and a spindle coupled to the compressor, where the spindle is configured to actuate a position of the compressor between a closed position and an open position such that the diaphragm forms the passage seal in the closed position or releases the passage seal in the open position.

According to other examples, the diaphragm valve assembly may further include a handwheel configured to actuate a position of the spindle between the open position and the closed position; and a bonnet to house the pressure ring, the compressor, and the spindle. The diaphragm valve assembly may also include a cover to be fitted over an upper portion of the bonnet and slideably coupled to the handwheel, where the cover comprises threads on an inner surface that match corresponding threads on an outer surface of the bonnet, and the cover is configured to enable the handwheel to be rotated in order to actuate the position of the spindle. The diaphragm valve assembly may also include a plurality of pins configured to receive pressure load from the cover; a load plate positioned in contact with the plurality of pins and configured to receive the pressure load from the plurality of pins; and one or more springs positioned in contact with the load plate and configured to receive the load pressure from the load plate; and provide peripheral sealing thrust to the pressure ring.

According to further examples, the diaphragm valve assembly may further include a diaphragm stud mechanically coupled to the compressor and inserted into a diaphragm boss in order to engage the diaphragm when releasing the passage seal based on a reverse thrust from the compressor. A pressure capacity of the valve assembly may be in a range from about 2300 psi to about 4400 psi. The opening may be substantially circularly shaped and the diaphragm may be substantially rectangularly shaped.

According to some examples, a diaphragm valve assembly may include a valve body having an inner wall, a first port defined by a first portion of the inner wall, a second port defined by a second portion of the inner wall, and a controllable flow path defined by a third portion of the inner wall between the first port and the second port; a plastic diaphragm positioned over an opening along the third portion of the inner wall, the diaphragm comprising a diaphragm membrane and a diaphragm boss that raises from a center portion of the diaphragm membrane, wherein the diaphragm is configured to provide a peripheral seal along a periphery of the opening and a passage seal along a diametric weir within the opening; a pressure ring in contact with a peripheral surface of the diaphragm membrane configured to provide a pressure load to the diaphragm membrane to provide the peripheral seal; a compressor within the pressure ring configured to selectively engage the diaphragm boss effective to form the passage seal; a diaphragm stud mechanically coupled to the compressor and inserted into the diaphragm boss in order to engage the diaphragm membrane when releasing the passage seal based on a reverse thrust from the compressor; a spring located between the diaphragm boss and the compressor around the diaphragm stud, the spring configured to provide relative compliance for the height of the diaphragm boss; and a spindle coupled to the compressor, where the spindle is configured to actuate a position of the compressor between a closed position and an open position such that the diaphragm membrane forms the passage seal in the closed position or releases the passage seal in the open position.

According to other examples, the diaphragm valve assembly may further include a handwheel configured to actuate a position of the spindle between the open position and the closed position; and a bonnet to house the pressure ring, the compressor, and the spindle. The diaphragm valve assembly may also include a cover to be fitted over an upper portion of the bonnet and slideably coupled to the handwheel, where the cover comprises threads on an inner surface that match corresponding threads on an outer surface of the bonnet, and the cover is configured to enable the handwheel to be rotated in order to actuate the position of the spindle.

According to further examples, the diaphragm valve assembly may further include a plurality of pins configured to receive pressure load from the cover; a load plate positioned in contact with the plurality of pins and configured to receive the pressure load from the plurality of pins; and one or more springs positioned in contact with the load plate and configured to receive the load pressure from the load plate; and provide peripheral sealing thrust to the pressure ring. A pressure capacity of the valve assembly may be in a range from about 2300 psi to about 4400 psi. The spring may be elastomer or metallic. The opening may be substantially circularly shaped.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
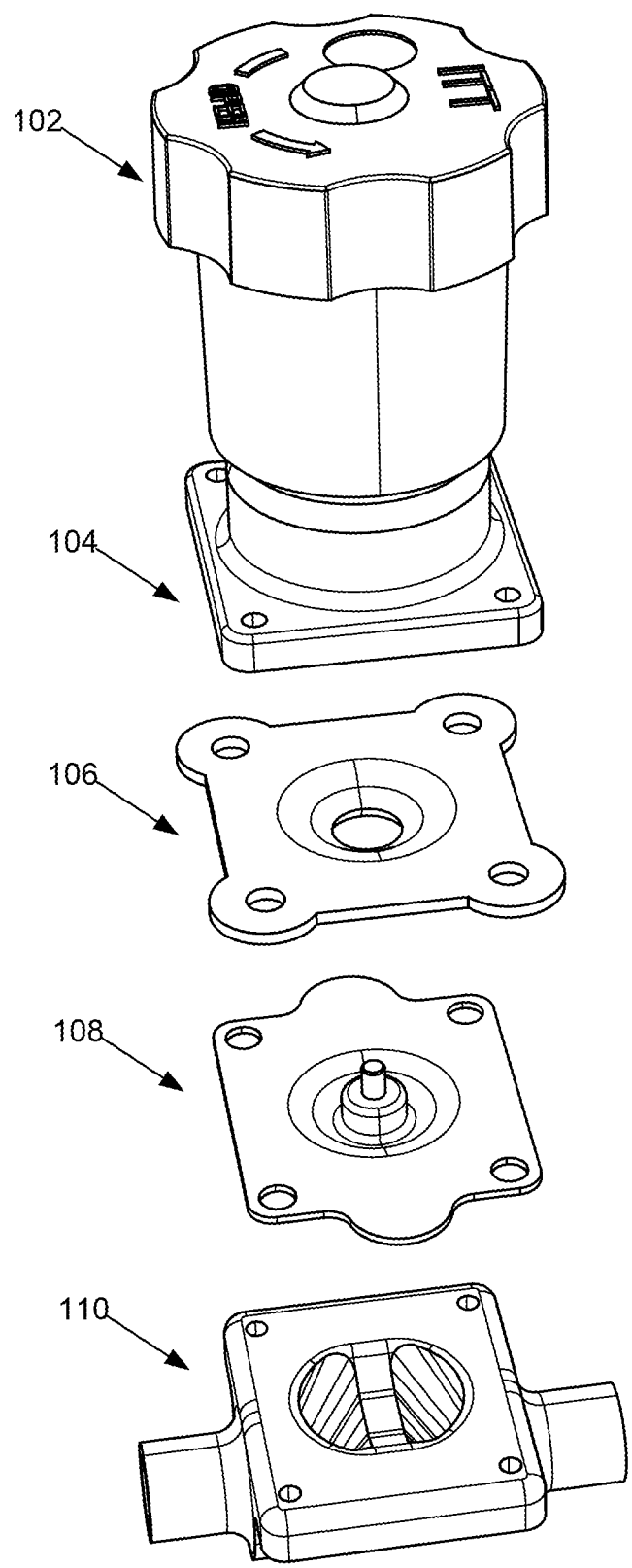
FIGS. 1A and 1B illustrate top and bottom exploded views of a valve assembly with a full flange backing cushion and raised bead on diaphragm at weir seal and peripheral seal.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices associated with diaphragm valves with plastic diaphragms and reduced or no elastomer backing cushion, where peripheral or all sealing forces may be applied directly to a diaphragm of the valve assembly.

Briefly stated, technologies are described for diaphragm valves with plastic diaphragm and reduced or no elastomer backing cushion, where peripheral or all sealing forces may be applied directly to the diaphragm of the valve assembly. In various examples, the valve assemblies may include a pressure ring to apply sealing force to a surface of the diaphragm with a reduced size or no backing cushion allowing a two-fold or more increase in pressure capacity of the valve assembly. In other examples, an elastomer or metallic spring placed above a center diaphragm boss may provide center-to-edge compliance for passage seal.

Figure 1B:
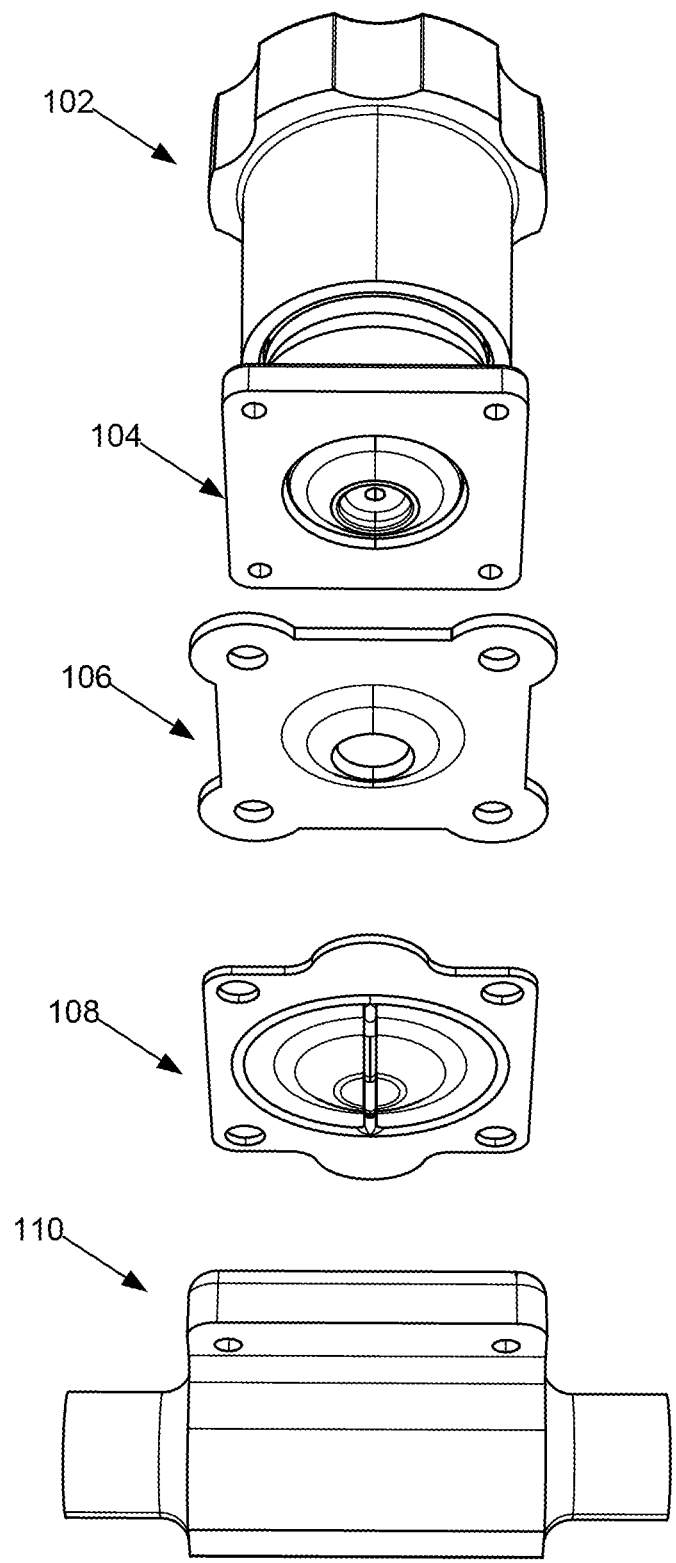

FIGS. 1A and 1B illustrate top and bottom exploded views of a valve assembly with a full flange backing cushion and raised bead on diaphragm at weir seal and peripheral seal.

FIGS. 1A and 1B both include handwheel 102, a bonnet 104, backing cushion 106, diaphragm assembly 108, and body 110. The body 110 may include an inner wall, a first portion of which may define a first one of the valve ports and a second portion of the inner wall may define a second one of the valve ports. In some examples, the valve ports may be designated as ingress and egress ports. The inner wall of the body 110 and the valve ports may define a controllable flow path that extends along the inner wall between the first one of the valve ports and the second one of the valve ports. Flow of liquids or gases through the controllable flow path may be controlled by the diaphragm assembly 108, which may provide peripheral seal as well as weir cross-section seal to restrict the flow.

Example embodiments are shown and discussed with specific components and configurations, which are not to be interpreted as limitations on embodiments. For example, various example valve assemblies are shown with a handwheel actuator. Other forms of mechanical actuation for the valve spindle/compressor such as pneumatic (with or without springs) or electric motor, or even hydraulic actuation may also be used in example implementations. Similarly, other parts may be replaced or configured differently depending on implementation specifications using the principles discussed herein.

Conventional diaphragm valves with plastic diaphragm have an elastomer member between the plastic diaphragm and the component providing the sealing load. Both the peripheral seal and the weir seal rely on the elastomer compliance to overcome component and assembly imperfections. The peripheral seal also depends on the elastomer spring loading to adjust for differential thermal expansion and contraction of the assembly components. Without the presence of the elastomer, the plastic diaphragm may be crushed by the metal components during heating, and may become loose when cooled, defeating the peripheral seal.

Figure 2A:
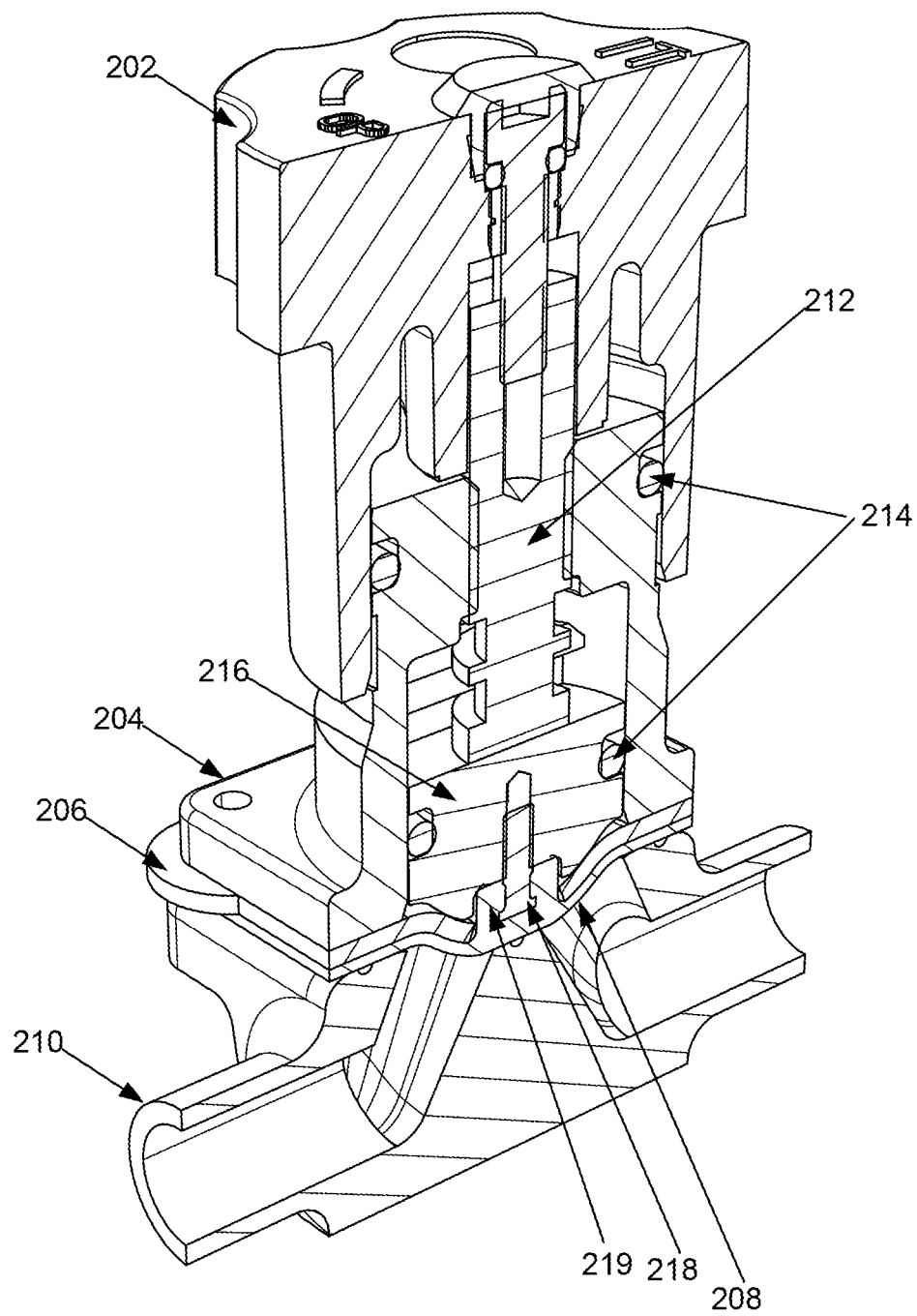
FIGS. 2A and 2B illustrate process flow and weir cross-sections of the valve assembly of FIGS. 1A and 1B in a closed valve position, where both peripheral and weir seals are engaged.
Figure 2B:
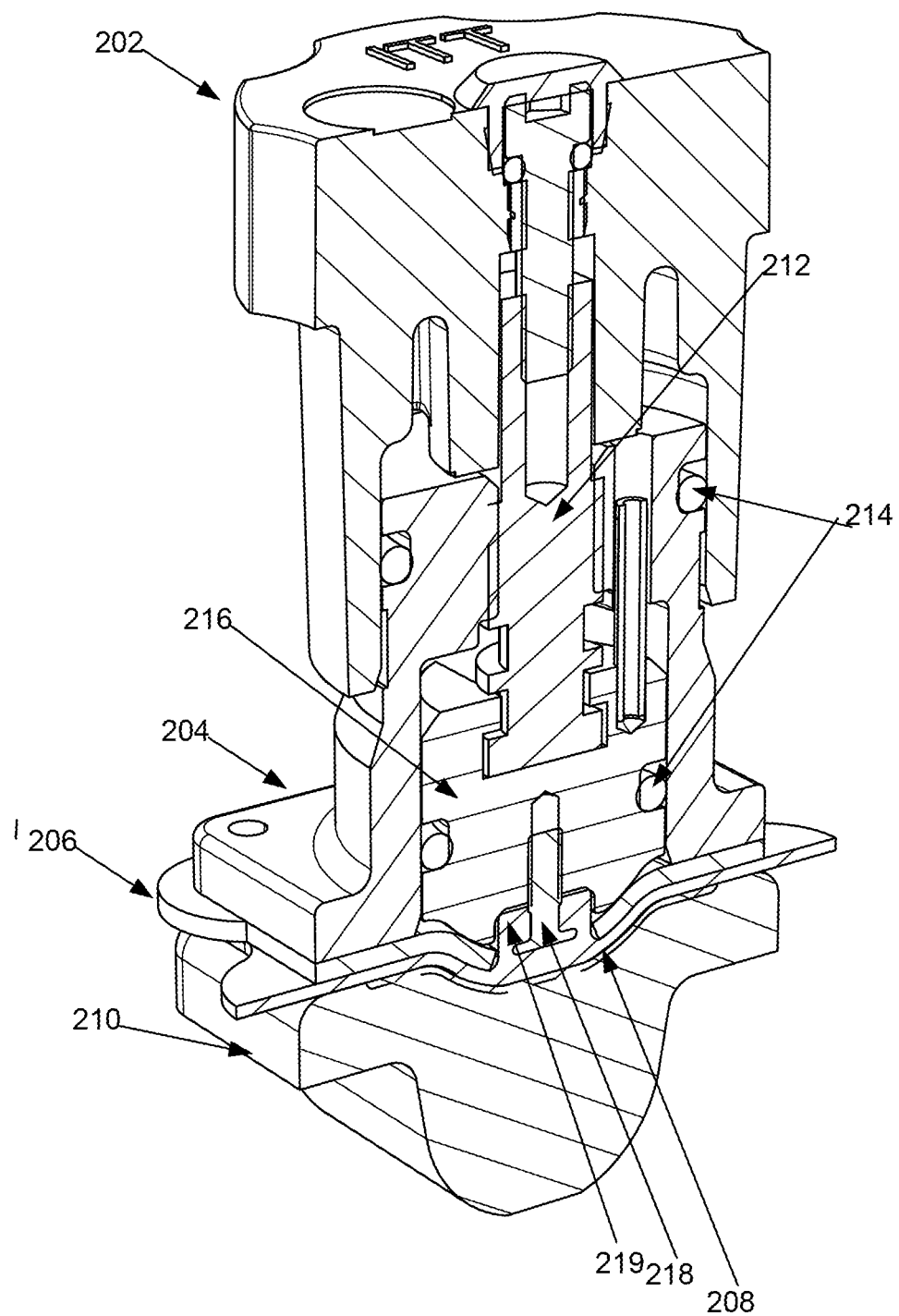

FIGS. 2A and 2B illustrate process flow and weir cross-sections of the valve assembly of FIGS. 1A and 1B in a closed valve position, where both peripheral and weir seals are engaged.

In the process view of FIG. 2A, the valve assembly is shown with the handwheel 202, bonnet 204, elastomer backing cushion 206, diaphragm assembly 208, and body 210. In the process flow cross-section, the body 210 is shown along a cross-section of the valve ports. The inner wall of the body is shaped such that a liquid or a gas is directed from an ingress port to the egress port through a raised center portion (diaphragm valve), where the diaphragm assembly 208 makes contact with the raised portion when pressed down and seals the passage preventing the liquid or gas from passing through. In addition to sealing the passage through the body, the diaphragm assembly 208 is also used to seal a periphery of the center portion preventing leakage from inside of the valve assembly to outside.

The bonnet 204 houses spindle 212, which through a movement of the handwheel 202 is pressed down onto compressor 216. Compressor 216, in turn, presses down a surface of the diaphragm assembly 208 (above the weir bead and diaphragm boss 219) for passage sealing. A diaphragm stud 218 may be used to provide mechanical force from the compressor to the center of the diaphragm assembly 208 when pulling up to open the passageway. O-rings 214 may be used to seal an inner wall of the bonnet 204 and an outside surface of the compressor 216, as well as, an outside wall of the bonnet 204 and an inside surface of the handwheel 202. A bottom portion of the bonnet 204 may press down onto a peripheral surface of the diaphragm assembly 208 allowing sealing of the periphery of the raised portion of the body 210.

The elastomeric backing cushion 206 is placed between the diaphragm assembly 208 and the bottom portion of the bonnet 204 providing the sealing load. Both the peripheral seal and the weir seal rely on the elastomer compliance for component and assembly imperfections. The peripheral seal also depends on the elastomer spring loading to adjust for thermal expansion and contraction of the assembly. Without the presence of the elastomer, the plastic diaphragm may be crushed by the metal components during heating, and may become loose when cooled, defeating the peripheral seal.

In the weir cross-section of FIG. 2B, the diaphragm assembly 208 is shown in pressed down state, where activated by the spindle 212, the compressor 216 pushes down on the diaphragm surface above the weir bead and the diaphragm boss 219 and consequently presses the center portion of the diaphragm assembly 208 onto a metal raised surface of the valve body preventing liquid or gas passage through the valve assembly.

Figure 3A:
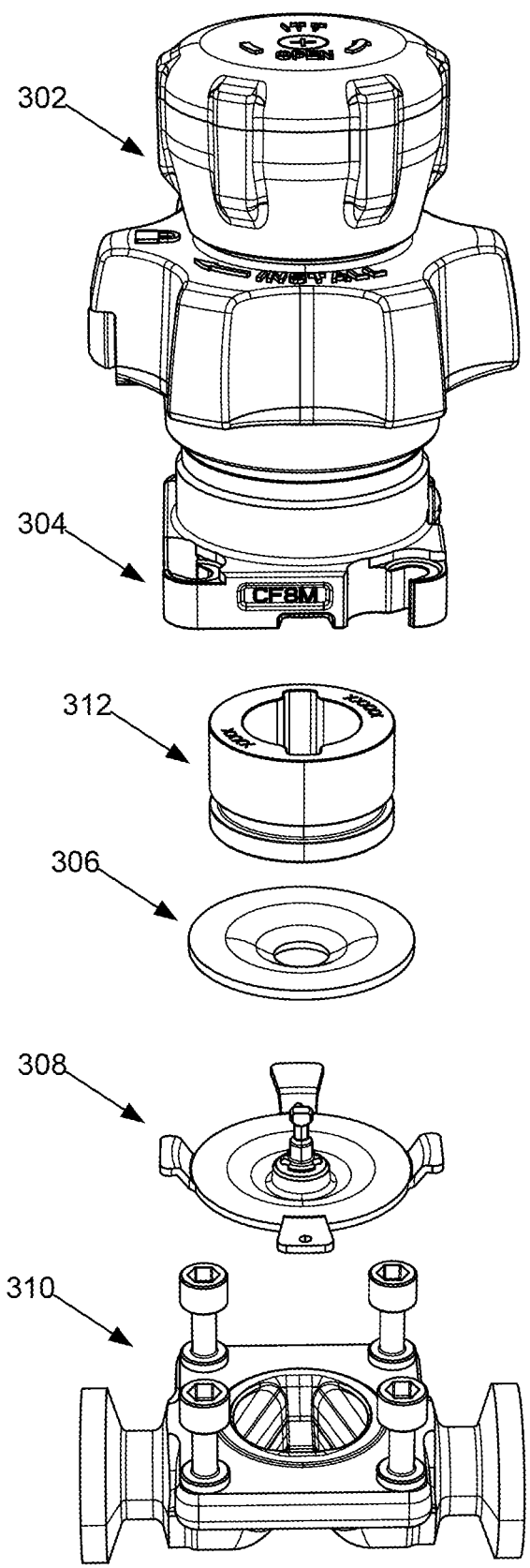
FIGS. 3A and 3B illustrate top and bottom exploded views of a valve assembly with a concentrated ring of contact on backing cushion and elimination of the raised diaphragm bead on the peripheral seal.
Figure 3B:
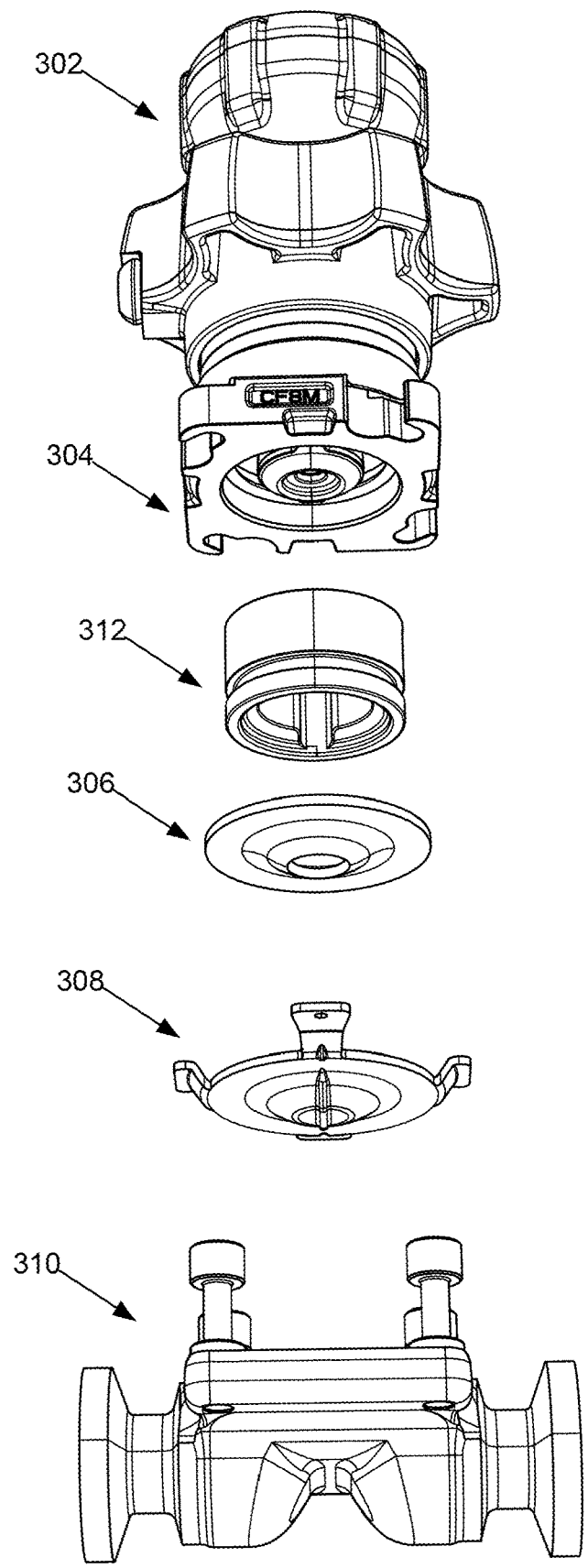

FIGS. 3A and 3B illustrate top and bottom exploded views of a valve assembly with a pressure ring on backing cushion and elimination of the raised diaphragm bead on the peripheral seal.

FIGS. 3A and 3B both include handwheel 302, a bonnet 304, pressure ring 312, backing cushion 306, diaphragm assembly 308, and body 310. The body 310 includes an inner wall, a first portion of which may define a first one of the valve ports and a second portion of the inner wall may define a second one of the valve ports. The inner wall of the body 310 and the valve ports define a controllable flow path that extends along the inner wall between the first one of the valve ports and the second one of the valve ports and includes the center portion with raised body bead for contacting the diaphragm assembly 308 and providing a peripheral seal (through the circumference of the substantially circular center portion) and a weir seal (through the diametric linear portion of the center portion).

The configurations shown in FIGS. 3A and 3B provide parallelism between peripheral sealing surfaces of the body flange and pressure ring, including allowable compliance for diaphragm thickness variation from non-parallel top/bottom diaphragm flange surfaces. Surface of the pressure ring, used for peripheral sealing, may be a highly controlled flat machined surface. Surface of the body flange or bead, used for peripheral sealing, may also be a highly controlled, flat machined surface.

Figure 4A:
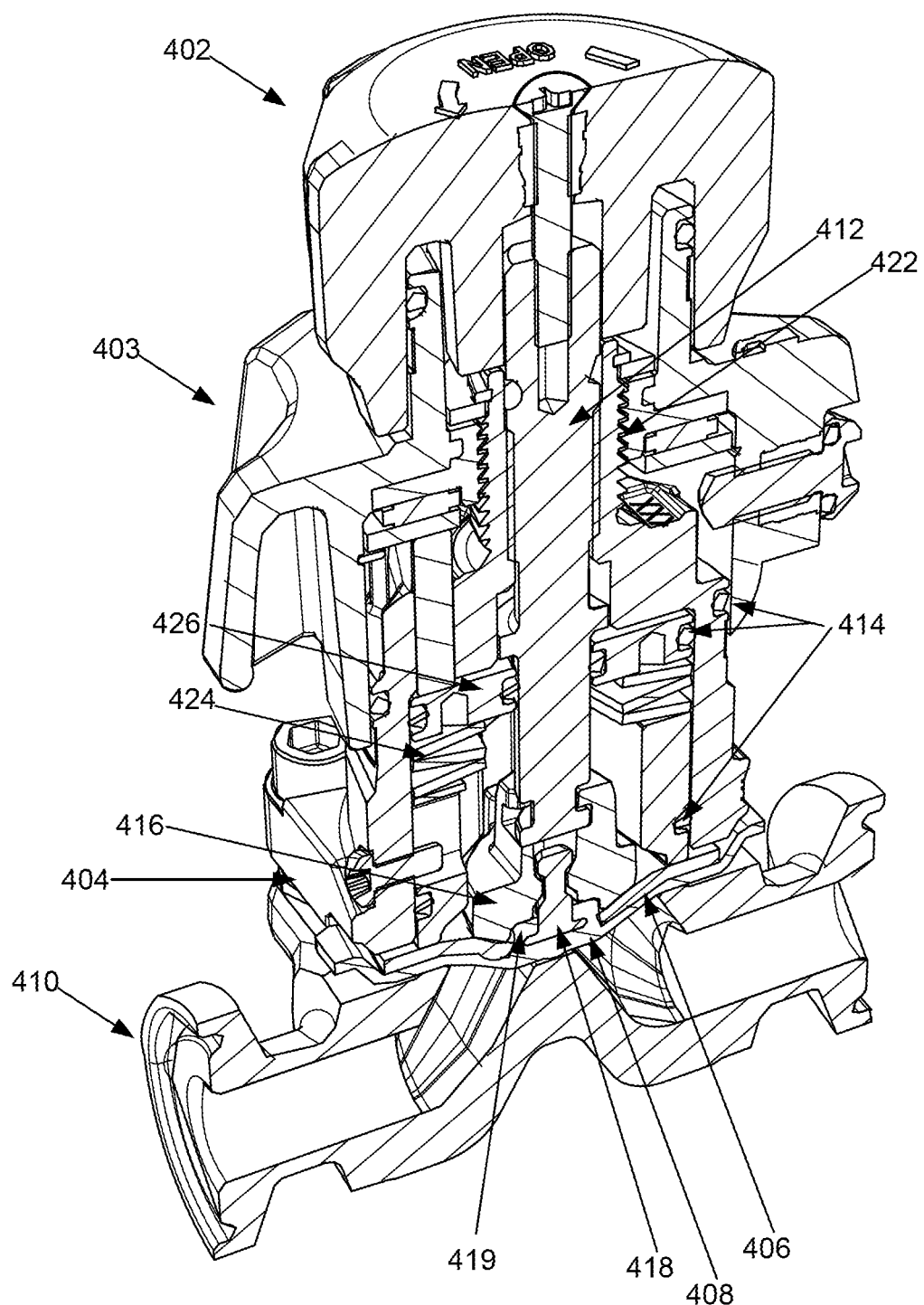
FIGS. 4A and 4B illustrate process flow and weir cross-sections of the valve assembly of FIGS. 3A and 3B.
Figure 4B:
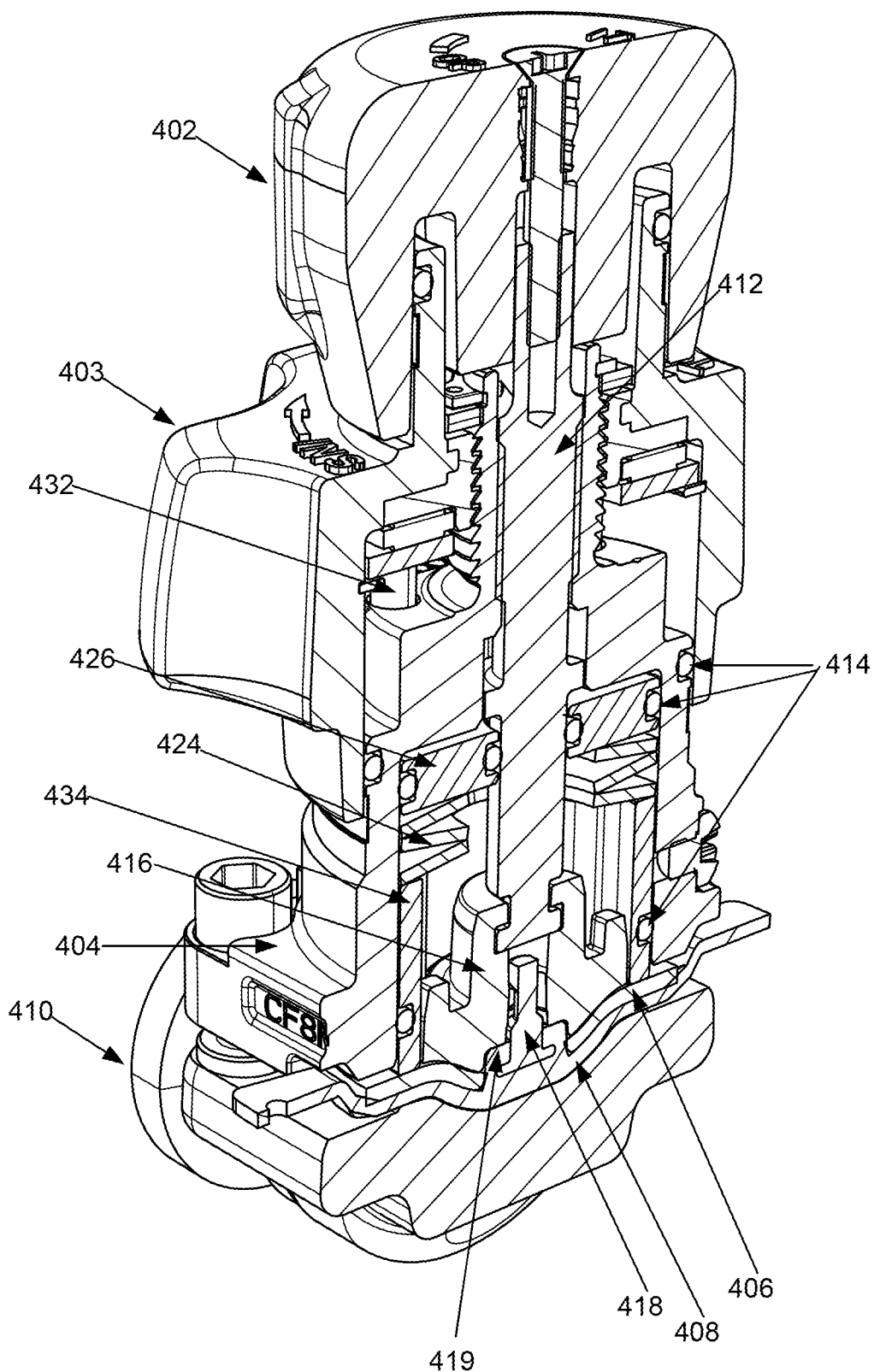

FIGS. 4A and 4B illustrate process flow and weir cross-sections of the valve assembly of FIGS. 3A and 3B in a closed valve position, where both peripheral and weir seals are engaged.

In the process view of FIG. 4A, the valve assembly is shown with the handwheel 402, cover 403, bonnet 404, elastomer backing cushion 406, diaphragm assembly 408, and body 410. In the process flow cross-section, the body 410 is shown along a cross-section of the valve ports. The inner wall of the body is shaped such that a liquid or a gas is directed from an ingress port to the egress port through a raised center portion (diaphragm valve), where the diaphragm assembly 408 makes contact with the raised portion when pressed down and seals the passage preventing the liquid or gas from passing through. In addition to sealing the passage through the body, the diaphragm assembly 408 is also used to seal a periphery of the center portion preventing leakage from inside of the valve assembly to outside.

The bonnet 404 houses spindle 412, which through a rotational movement of the handwheel 402 is pressed down onto compressor 416. Compressor 416, in turn, presses down a surface of the diaphragm assembly 408 (above the weir bead and diaphragm boss 419) for passage sealing. A diaphragm stud 418 may be used to provide mechanical force from the compressor to the center of the diaphragm assembly 408 when pulling up to open the passageway. The cover 403 locks the bonnet 404 to the body 410 and is secured to an upper portion of the body through a threaded coupling. The bonnet 404 also contains springs 424 to provide peripheral sealing load and load plate 426. Pins 432 transfer the cover load to the load plate 426, which transfers the load to the springs 424, through the pressure ring 434, applying the peripheral sealing force to the diaphragm 408.

O-rings 414 may be used to seal an inner wall of the bonnet 404 and an outside surface of the pressure ring 434, load plate 426 to an inner surface of the bonnet 404, as well as, an outside wall of the bonnet 404 and an inside surface of the cover 403. The pressure ring 434 described above provides the force for the peripheral seal between the diaphragm and the body, and the spindle/compressor thrust makes the weir seal, pressing on the diaphragm center boss above the weir.

The configuration shown in FIGS. 4A (and 4B) uses springs 424 to provide peripheral sealing thrust throughout life, providing for compensation during mechanical and thermal cycling. Furthermore, the configuration provides excellent centering and position control of all components including superior control of the body-to-upper portion parts positioning, and provides parallelism between peripheral sealing surfaces of the body flange and pressure ring, including allowable compliance for diaphragm thickness variation from non-parallel top/bottom diaphragm flange surfaces. Surface of the pressure ring, used for peripheral sealing, may be a highly controlled flat machined surface. Surface of the body flange or bead, used for peripheral sealing, may also be a highly controlled, flat machined surface. Surfaces of the compressor, used for passage sealing, are highly controlled machined surfaces as well.

In the weir cross-section of FIG. 4B, the diaphragm assembly 408 is shown in pressed down state, where activated by the spindle 414, the compressor 416 pushes down the diaphragm boss 419 and consequently presses the center portion of the diaphragm assembly 408 onto a metal raised surface of the valve body preventing liquid or gas passage through the valve assembly. With the peripheral seal pressure transmitted thru the elastomer backing cushion, the pressure is limited to approximately 2200 psi. Above that pressure, the elastomer experiences extreme and unacceptable creep deformation and shear.

Figure 5A:
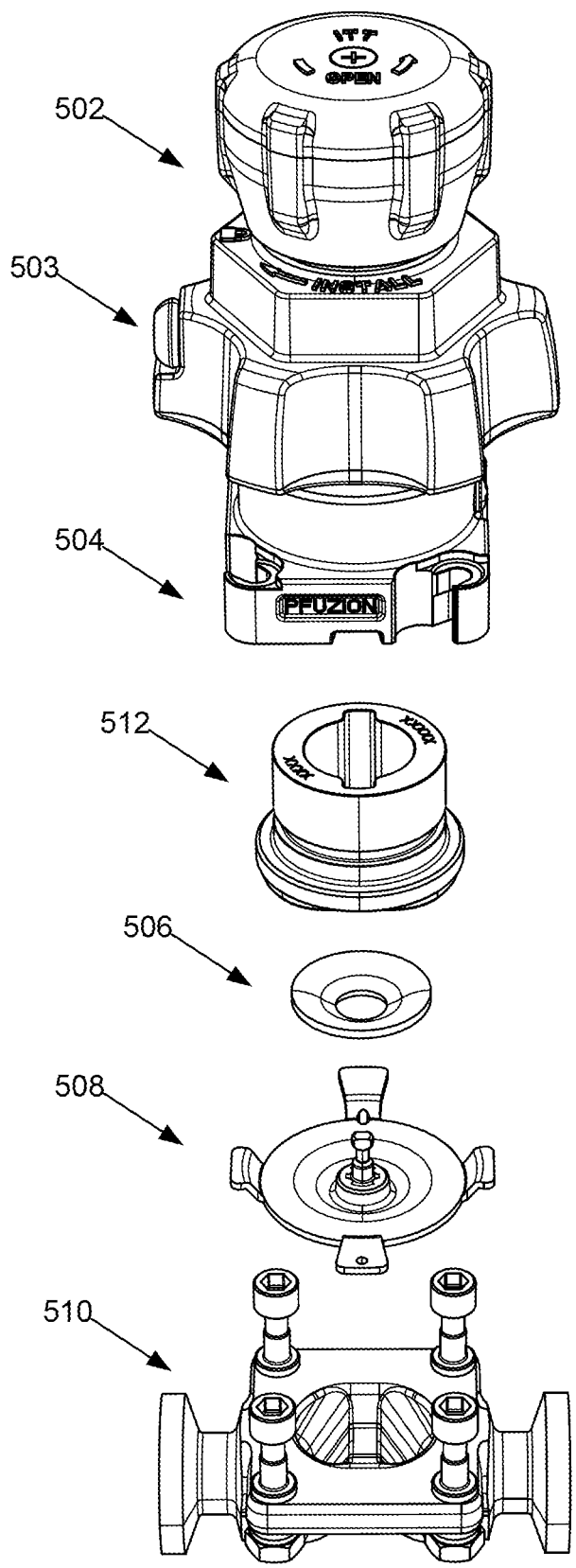
FIGS. 5A and 5B illustrate top and bottom exploded views of a valve assembly, where peripheral sealing force is applied directly to the diaphragm.
Figure 5B:
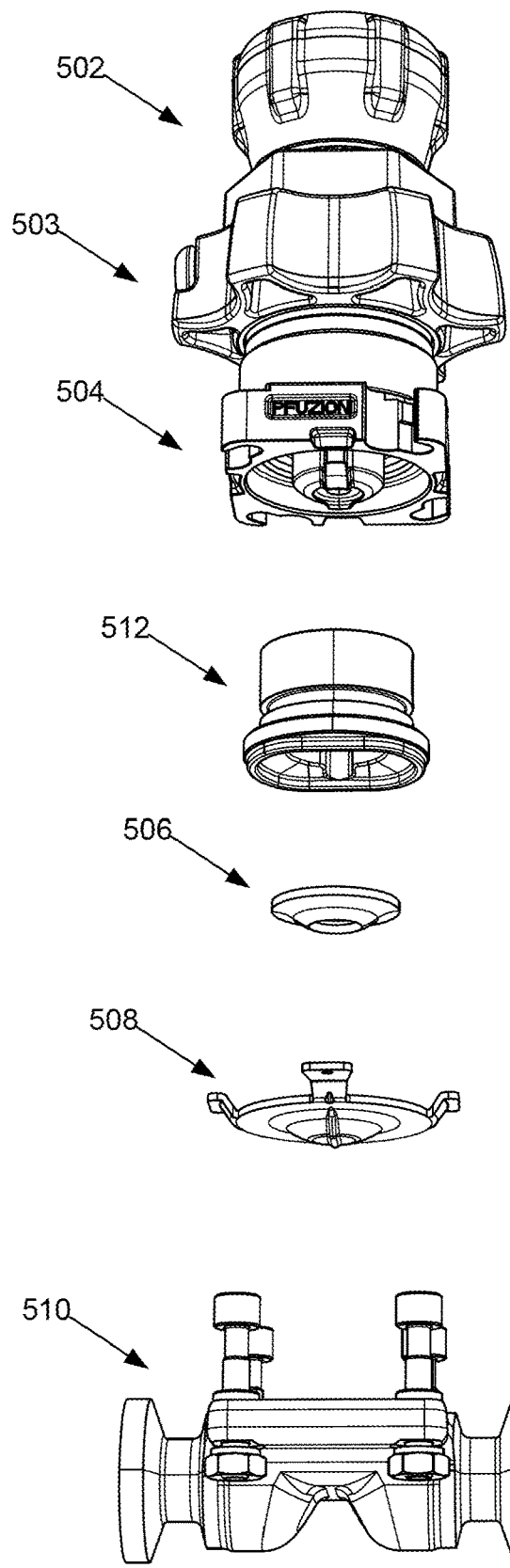

FIGS. 5A and 5B illustrate top and bottom exploded views of a valve assembly, where peripheral sealing force is applied directly to the diaphragm, arranged in accordance with at least some embodiments described herein.

FIGS. 5A and 5B both include handwheel 502, cover 503, a bonnet 504, pressure ring 512, reduced backing cushion 506, diaphragm assembly 508, and body 510. The body 510 includes an inner wall, a first portion of which may define a first one of the valve ports and a second portion of the inner wall may define a second one of the valve ports. The inner wall of the body 510 and the valve ports define a controllable flow path that extends along the inner wall between the first one of the valve ports and the second one of the valve ports and includes the center portion for contacting the diaphragm assembly 508 and providing a peripheral seal (through the circumference of the substantially circular center portion) and a weir seal (through the diametric linear portion of the center portion).

Because of the parallelism provided between peripheral sealing surfaces of the body flange and pressure ring, where a surface of the pressure ring and a surface of the body flange or bead may be a highly controlled flat machined surface, the backing cushion may have a reduced, substantially ring shape allowing higher pressure capacities for the valve assembly.

Figure 6A:
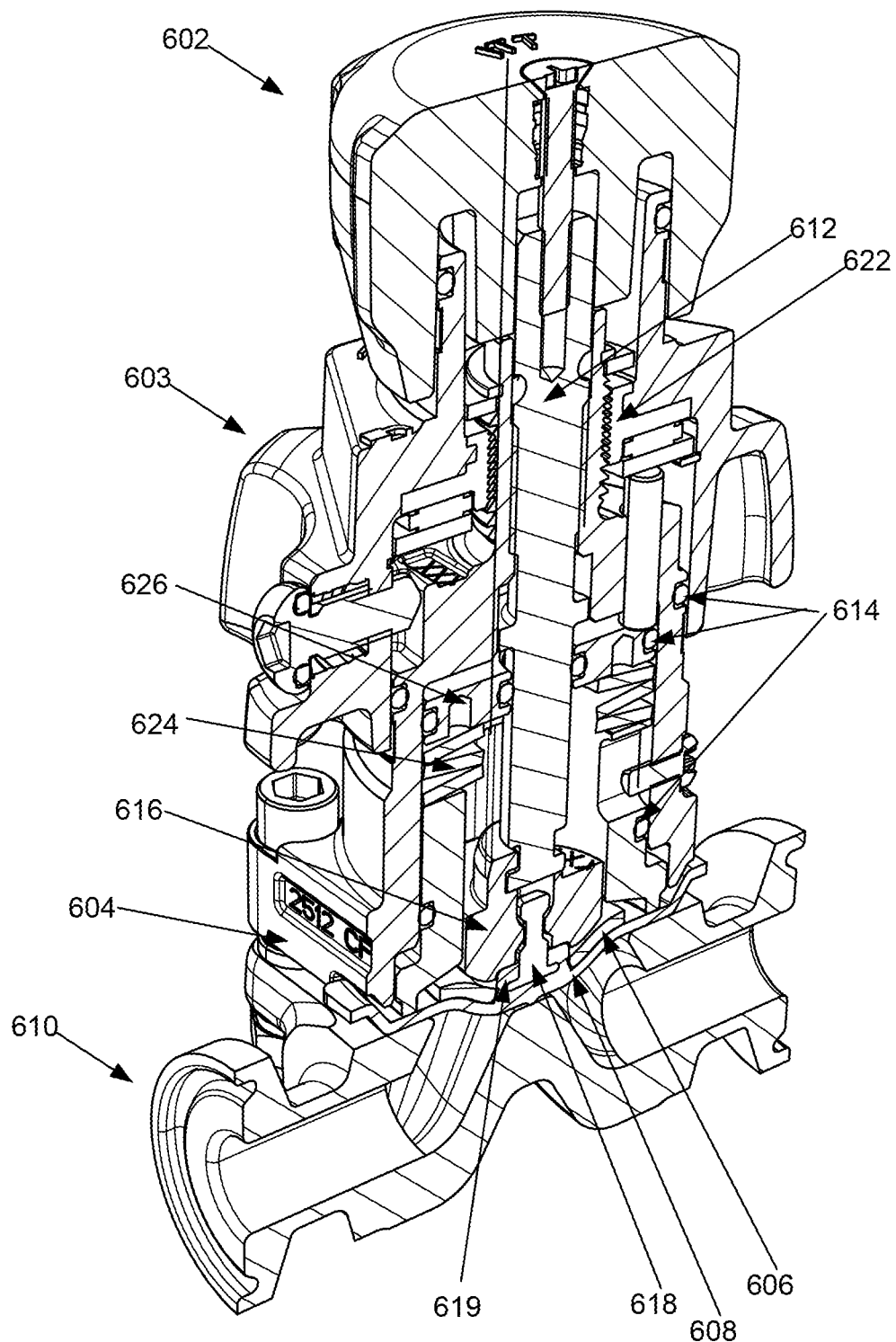
FIGS. 6A and 6B illustrate process flow and weir cross-sections of the valve assembly of FIGS. 5A and 5B.
Figure 6B:
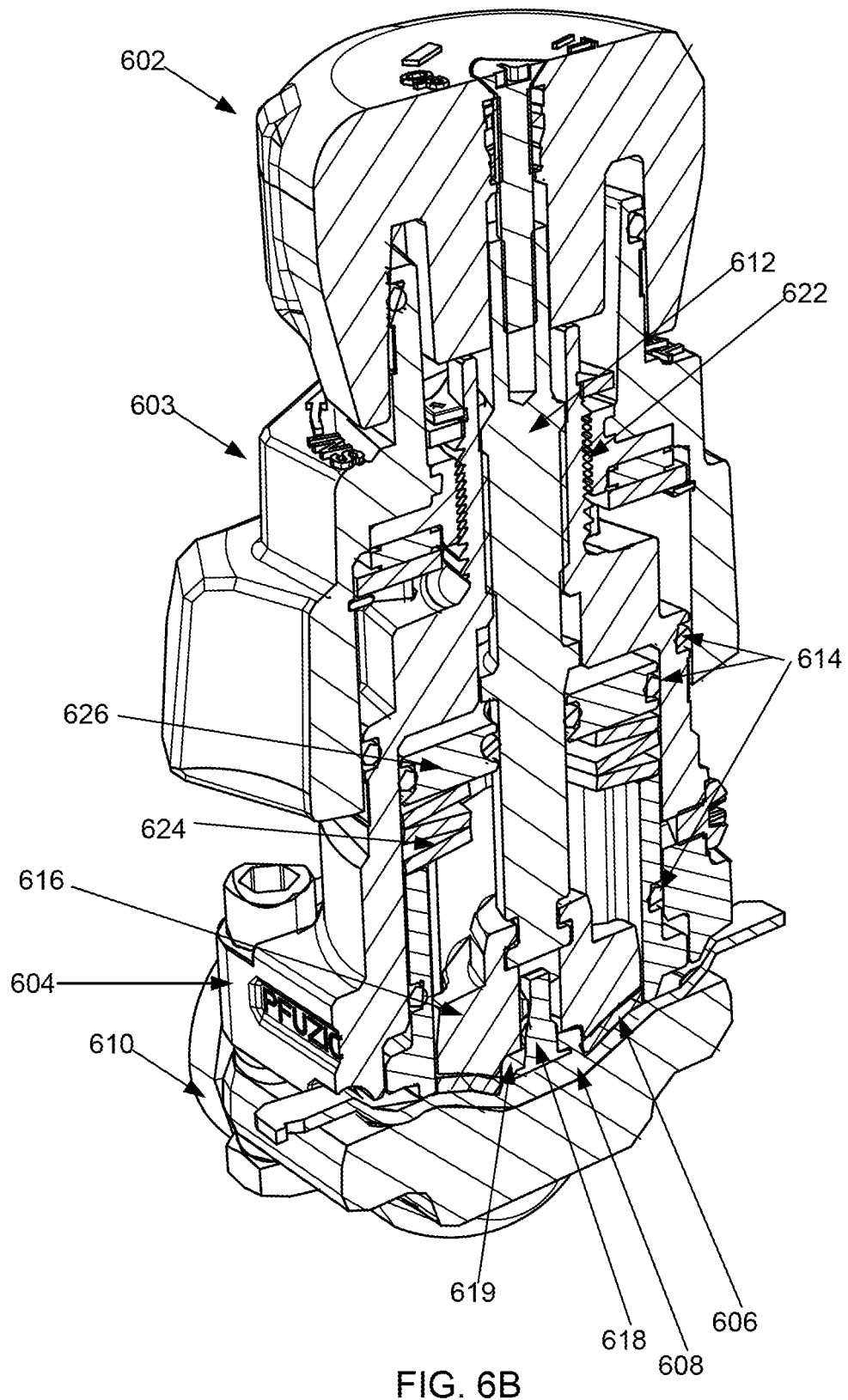

FIGS. 6A and 6B illustrate process flow and weir cross-sections of the valve assembly of FIGS. 5A and 5B in a closed valve position, where both peripheral and weir seals are engaged, arranged in accordance with at least some embodiments described herein.

In the process view of FIG. 6A, the valve assembly is shown with the handwheel 602, cover 603, bonnet 604, elastomer backing cushion 606, diaphragm assembly 608, and body 610. In the process flow cross-section, the body 610 is shown along a cross-section of the valve ports. The inner wall of the body is shaped such that a liquid or a gas is directed from an ingress port to the egress port through a center portion (diaphragm valve), where the diaphragm assembly 608 makes contact with the periphery of the center portion when installed and makes contact with a diametric linear portion when pressed down to seal the passage preventing the liquid or gas from passing through.

The bonnet 604 houses spindle 612, which through a rotational movement of the handwheel 602 is pressed down onto compressor 616. Compressor 616, in turn, presses down a surface of the diaphragm assembly 608 (above the weir bead and diaphragm boss 619) for passage sealing. A diaphragm stud 618 may be used to provide mechanical force from the compressor to the center of the diaphragm assembly 608 when pulling up to open the passageway. The cover 603 locks the bonnet 604 to the body 610 and is secured to an upper portion of the body through a threaded coupling.

O-rings 614 may be used to seal an inner wall of the bonnet 604 and an outside surface of the pressure ring 512, load plate 626 to an inner surface of the bonnet 604, as well as, an outside wall of the bonnet 604 and an inside surface of the cover 603. A bottom portion of the pressure ring 512 may press down onto a peripheral surface of the diaphragm assembly 608 allowing sealing of the periphery of the raised portion of the body 610.

Because of the spring force provided by the springs 624 onto the pressure ring 512, the elastomeric backing cushion 606 has a substantially ring shape which does not cover the contact area between the pressure ring and the diaphragm along the periphery. Elimination of the elastomer backing cushion above the peripheral seal of the diaphragm has allows use of concentrated high seal pressures (e.g., up to 4400 psi) to provide enhanced peripheral seal capabilities, even on flat flanges having very poor surface finishes even under extreme thermal cycle and mechanical cycle conditions. The reduced backing cushion 606 may be a simple washer shaped stamping of sheet material simple to install over the diaphragm boss and may not require special orientation procedure.

In the weir cross-section of FIG. 6B, the diaphragm assembly 608 is shown in pressed down state, where activated by the spindle 614, the compressor 616 pushes down the diaphragm boss 619 and consequently presses the center portion of the diaphragm assembly 608 onto a metal surface of the valve body preventing liquid or gas passage through the valve assembly. The valve assembly configuration with reduced backing cushion may have enhanced pressure capacity, for example, from 2300 psi to about 4400 psi.

When providing a peripheral seal of a diaphragm on a poor body surface, the seal pressure may have to be increased so that the plastic diaphragm molds to the surface imperfections. Having a layer of elastic material (elastomer backing cushion) between the compressive structure above, and the diaphragm below, serves to dilute the load over a larger area, decreasing pressure. If the required pressure is very high, such as required to mold the plastic to the flange imperfections, the elastomer may experience compressive shear, fracturing and disabling the life of the elastomer layer. Simple elastomer backing cushions made from cut sheet have a cut in the interior for passage of the diaphragm connection to the compressor, and around the periphery. When an inlaid fabric is required for strength, these fibers also provide a passageway defeating sealed bonnet capability. Having an elastomer layer under the compressor allows system compliance for part variation and both part and subassembly misalignment. However, the elastomer layer also dilutes the actuator load over a larger area, reducing the passage seal pressure and likewise the seal efficiency. Some, but not all of the loss may be recovered by a diaphragm bead as discussed in FIG. 3A, 3B. Use of a backing cushion also adds a component to the valve assembly and requires control and orientation of that component. This added cost and complexity is not only experienced with the initial valve offering, but again with every diaphragm assembly replacement.

Figure 7A:
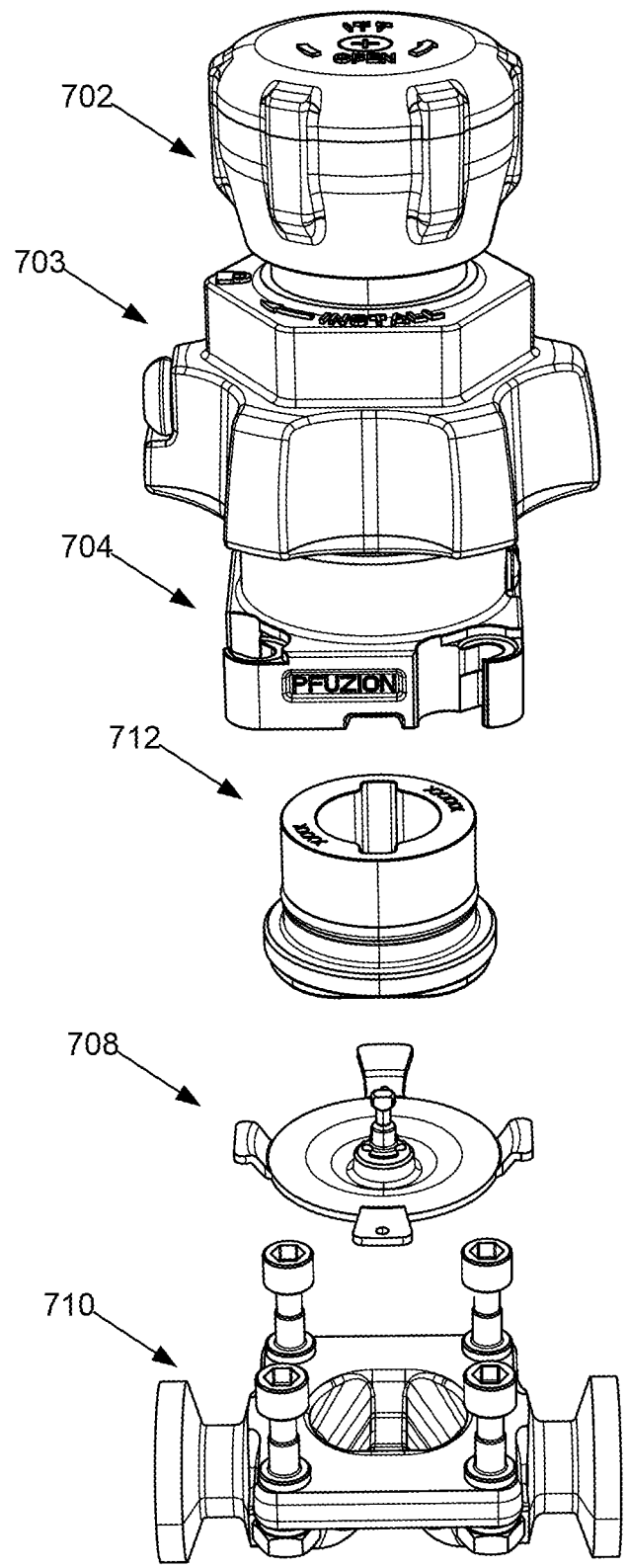
FIGS. 7A and 7B illustrate top and bottom exploded views of a valve assembly, where all sealing forces are applied directly to the diaphragm.
Figure 7B:
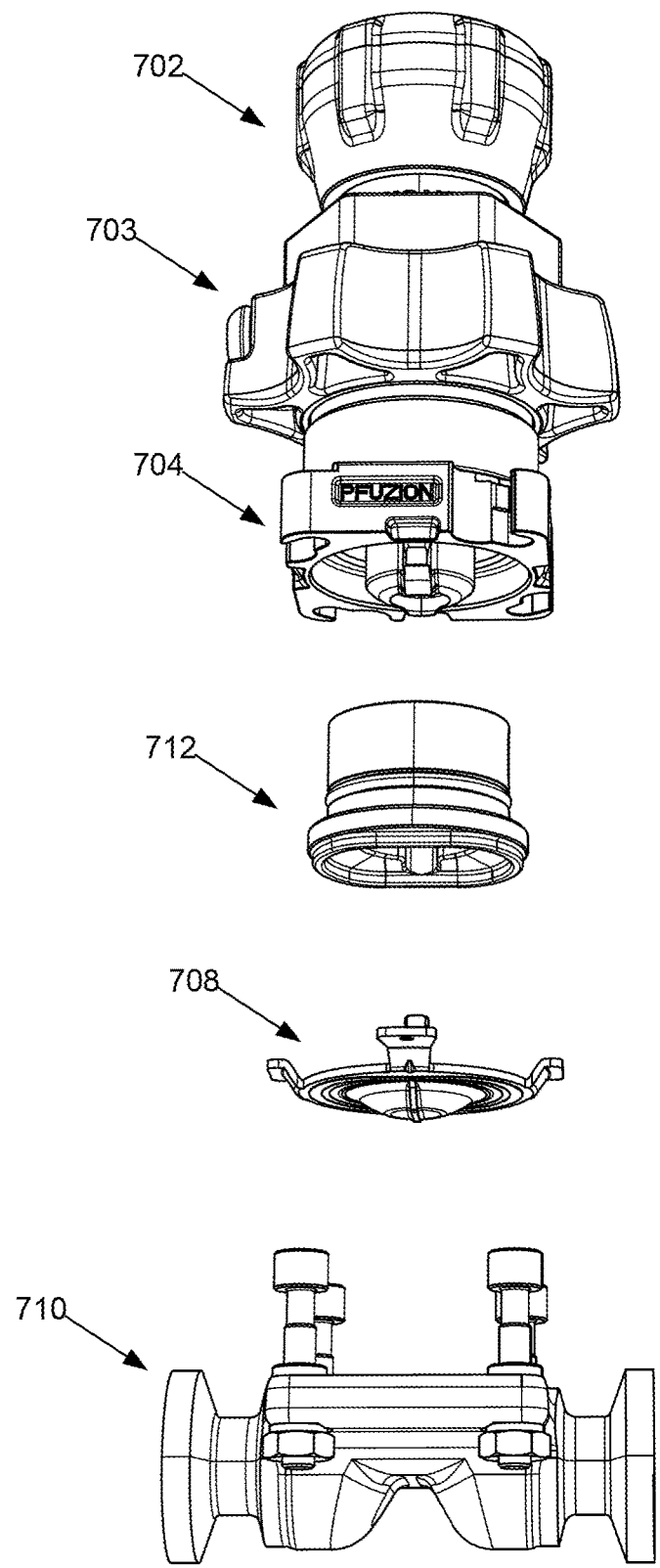

FIGS. 7A and 7B illustrate top and bottom exploded views of a valve assembly, where all sealing forces are applied directly to the diaphragm, arranged in accordance with at least some embodiments described herein.

FIGS. 7A and 7B both include handwheel 702, cover 703, a bonnet 704, pressure ring 712, diaphragm assembly 708, and body 710. The body 710 includes an inner wall, a first portion of which may define a first one of the valve ports and a second portion of the inner wall may define a second one of the valve ports. The inner wall of the body 710 and the valve ports define a controllable flow path that extends along the inner wall between the first one of the valve ports and the second one of the valve ports and includes the center portion for contacting the diaphragm assembly 708 and providing a peripheral seal (through the circumference of the substantially circular center portion) and a weir seal (through the diametric linear portion of the center portion).

In the configuration of FIGS. 7A and 7B, the elastomer backing cushion is completely removed. Thus, the required pressure load can be met with reduced force. Elimination of the elastomer backing cushion from the valve assembly may be made in systems that have the advantages of the pressure ring and internal springs as described above. In such systems, the requirement for the compressor thrust compliance may be greatly reduced.

Figure 8:
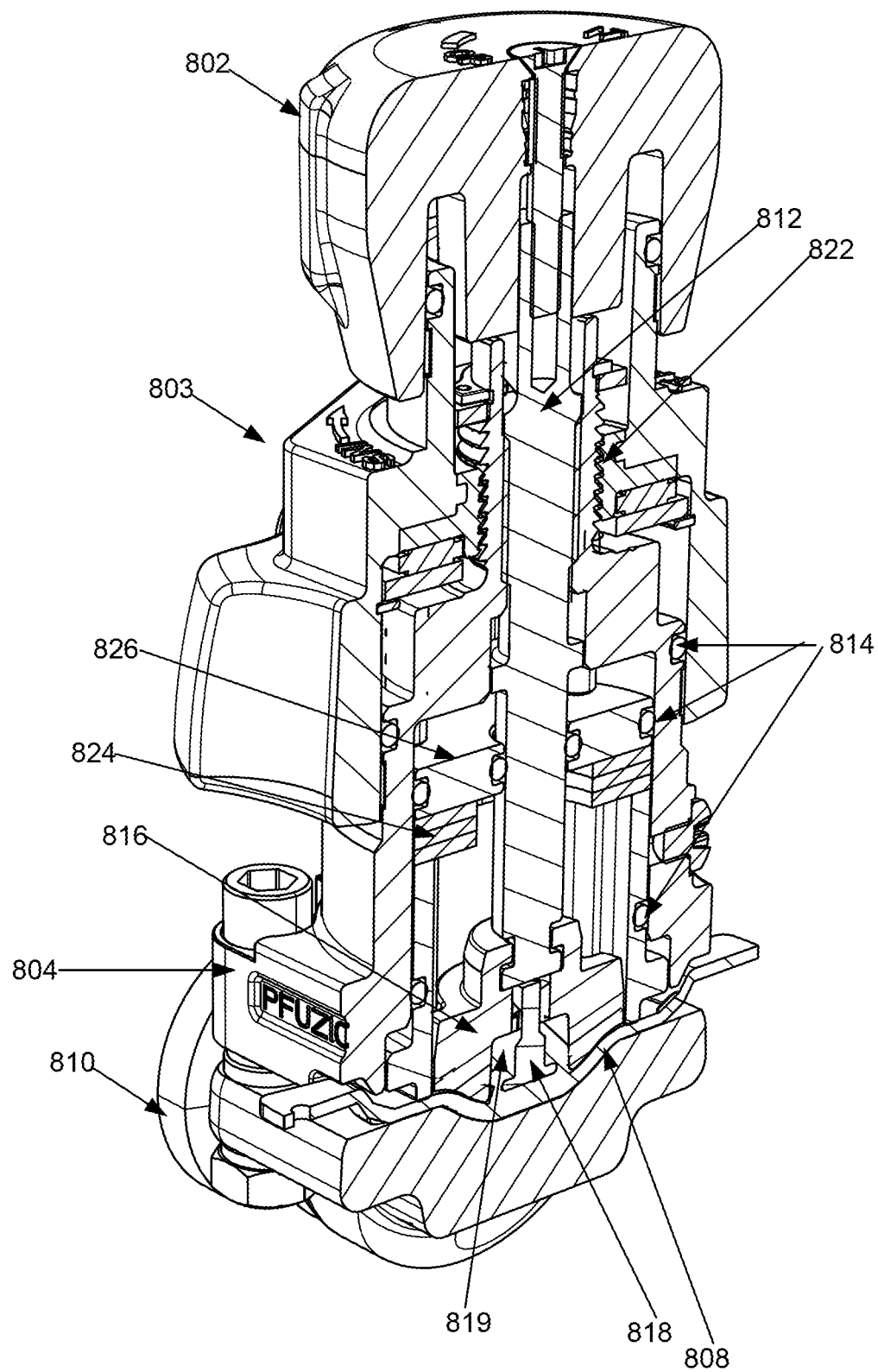
FIG. 8 illustrates weir cross-section of the valve assembly of FIGS. 7A and 7B.

FIG. 8 illustrates weir cross-section of the valve assembly of FIGS. 7A and 7B in a closed valve position, where both peripheral and weir seals are engaged, arranged in accordance with at least some embodiments described herein.

In the weir cross-section view of FIG. 8, the valve assembly is shown with the handwheel 802, cover 803, bonnet 804, diaphragm assembly 808, and body 810. In the process flow cross-section, the body 810 is shown along a cross-section of the valve ports. The inner wall of the body is shaped such that a liquid or a gas is directed from an ingress port to the egress port through a center portion (diaphragm valve), where the diaphragm assembly 808 makes contact with the periphery of the center portion when installed and makes contact with a diametric linear portion when pressed down to seal the passage preventing the liquid or gas from passing through.

The bonnet 804 houses spindle 812, which through a rotational movement of the handwheel 802 is pressed down onto compressor 816. Compressor 816, in turn, presses down a surface of the diaphragm assembly 808 (above the weir bead and diaphragm boss 819) for passage sealing. A diaphragm stud 818 may be used to provide mechanical force from the compressor to the center of the diaphragm assembly 808 when pulling up to open the passageway. The cover 803 locks the bonnet 804 to the body 810 and is secured to an upper portion of the body through a threaded coupling 822.

O-rings 814 may be used to seal an inner wall of the bonnet 804 and an outside surface of the pressure ring 712, load plate 828 to an inner surface of the bonnet 804, as well as, an outside wall of the bonnet 804 and an inside surface of the cover 803. A bottom portion of the pressure ring 712 may press down onto a peripheral surface of the diaphragm assembly 808 allowing sealing of the periphery of the body 810.

Because of the spring force provided by the springs 824 onto the pressure ring 712, the elastomeric backing cushion is completely eliminated. Elimination of the elastomer backing cushion above the peripheral seal and the passage seal of the diaphragm has allows use of concentrated high seal pressures (e.g., up to 4400 psi) to provide enhanced peripheral seal capabilities, even on flat flanges having very poor surface finishes even under extreme thermal cycle and mechanical cycle conditions, as well as increased valve capability or the option of using less costly smaller actuation.

Figure 9:
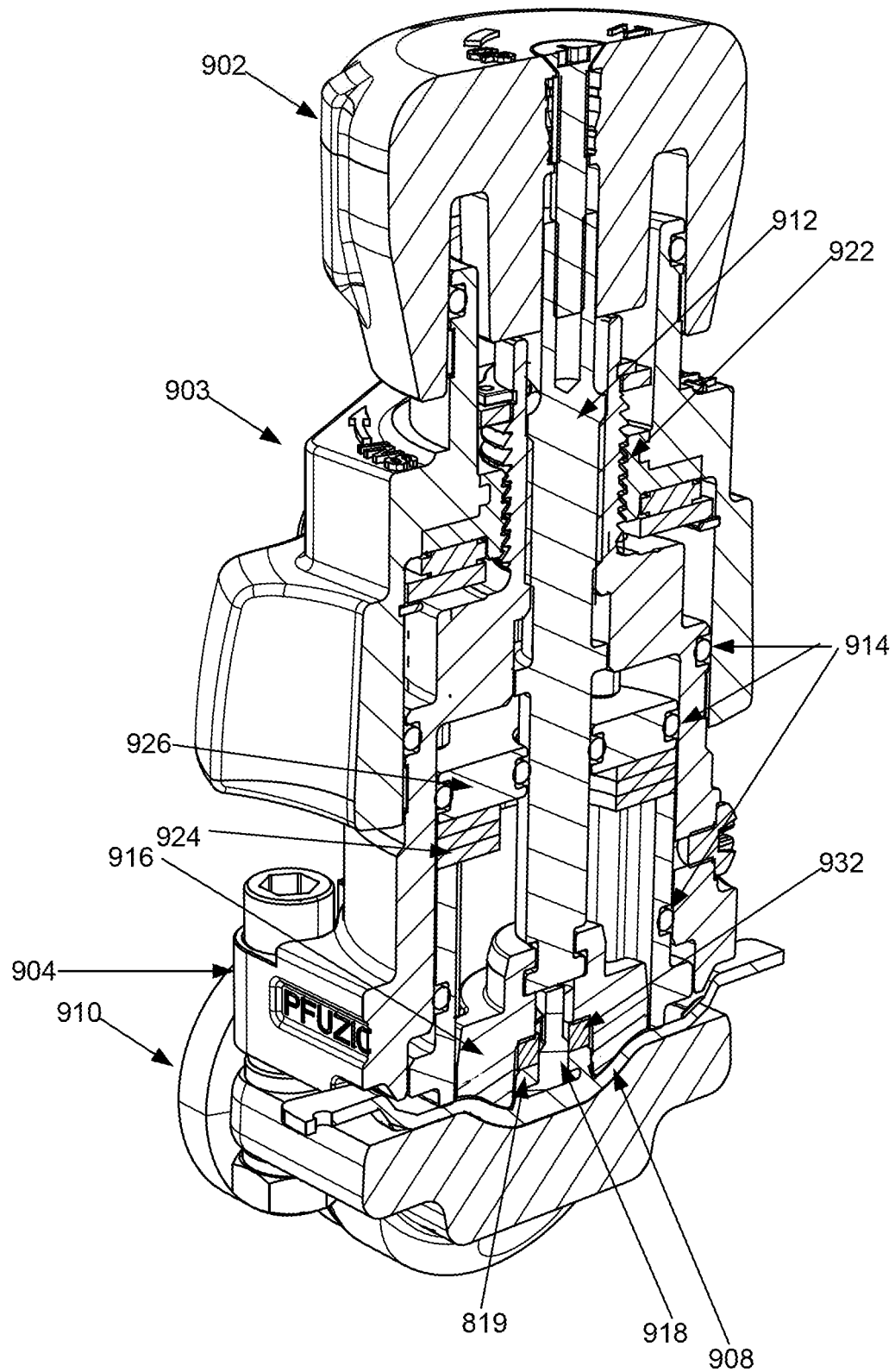
FIG. 9 illustrates weir cross-section of the valve assembly of FIGS. 7A and 7B with a spring above a center diaphragm boss to provide center-to-edge compliance for passage seal, some of which are arranged in accordance with at least some embodiments described herein.

FIG. 9 illustrates weir cross-section of the valve assembly of FIGS. 7A and 7B with a spring above a center diaphragm boss to provide center-to-edge compliance for passage seal in a closed valve position, where both peripheral and weir seals are engaged, arranged in accordance with at least some embodiments described herein.

In the weir cross-section view of FIG. 9, the valve assembly is shown with the handwheel 902, cover 903, bonnet 904, diaphragm assembly 908, and body 910. In the process flow cross-section, the body 910 is shown along a cross-section of the valve ports. The inner wall of the body is shaped such that a liquid or a gas is directed from an ingress port to the egress port through a center portion (diaphragm valve), where the diaphragm assembly 908 makes contact with the periphery of the center portion when installed and makes contact with a diametric linear portion (weir) when pressed down to seal the passage preventing the liquid or gas from passing through.

The bonnet 904 houses spindle 912, which through a rotational movement of the handwheel 902 is pressed down onto compressor 916. Compressor 916, in turn, presses down a surface of the diaphragm assembly 908 (above the weir bead and diaphragm boss 919) for passage sealing. A diaphragm stud 918 may be used to provide mechanical force from the compressor to the center of the diaphragm assembly 908 when pulling up to open the passageway. A spring (elastomeric or metallic) 932 may provide relative compliance for the height of the boss, in lieu of the elastomer backing cushion under the compressor 916. The cover 903 locks the bonnet 904 to the body 910 and is secured to an upper portion of the body through a threaded coupling 922. The bonnet 904 also contains springs 924 to provide peripheral sealing load and load plate 926.

O-rings 914 may be used to seal an inner wall of the bonnet 904 and an outside surface of the pressure ring 712, load plate 928 to an inner surface of the bonnet 904, as well as, an outside wall of the bonnet 904 and an inside surface of the cover 903. A bottom portion of the pressure ring 712 may press down onto a peripheral surface of the diaphragm assembly 908 allowing sealing of the periphery of the body 910.

As mentioned above, a small spring 932, elastomer or metallic, may be used above the diaphragm boss to provide relative compliance for the height of the boss, in lieu of the elastomer under the compressor. With the elimination of the backing cushion, some other form of passage seal compliance may be needed. Placing of a compliant material above the diaphragm boss may help assure even distribution of the actuator thrust between the seal located below the boss, and the remainder of the passage seal.

As discussed previously, embodiments are not limited to handwheel actuation. Pneumatic (with or without springs) or electric motor, or even hydraulic actuation may also be used in example implementations without departing from the principles described herein.

The benefits of the presently disclosed valve assembly devices are numerous. For example, the valve assemblies with reduced or removed elastomer backing cushions disclosed herein may allow for increased and/or concentrated loading of the peripheral seal so the seal can be achieved and maintained when using plastic diaphragms on poor body flange surface finishes. Examples systems may also allow for concentrated loading of the passage seal, so the seal can be achieved and maintained with reduced actuation thrust. This efficiency can further allow for reduced actuator size and cost while increasing cycle life. Another benefit of examples valve assemblies may include simplification of the plastic diaphragm assembly to eliminate components and/or component complexity while adding control with improvement of seal reliability.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A diaphragm valve assembly comprising:
   a valve body having an inner wall, a first port defined by a first portion of the inner wall, a second port defined by a second portion of the inner wall, and a controllable flow path defined by a third portion of the inner wall between the first port and the second port;
   a plastic diaphragm positioned over an opening along the third portion of the inner wall, the diaphragm configured to provide a peripheral seal along a periphery of the opening and a passage seal along a diametric weir within the opening;
   a pressure ring in contact with a peripheral surface of the diaphragm configured to provide a pressure load to the diaphragm to provide the peripheral seal;
   an elastic reduced backing cushion that is substantially ring-shaped and configured to be fitted over the diaphragm within the pressure ring;
   a compressor within the pressure ring and in partial contact with the reduced backing cushion, the compressor configured to selectively engage a center portion of the diaphragm effective to form the passage seal;
   a spindle coupled to the compressor, wherein the spindle is configured to actuate a position of the compressor between a closed position and an open position such that the diaphragm forms the passage seal in the closed position or releases the passage seal in the open position;
   a handwheel configured to actuate a position of the spindle between the open position and the closed position;
   a bonnet to house the pressure ring, the compressor, and the spindle;
   a cover to be fitted over an upper portion of the bonnet and slideably coupled to the handwheel, wherein the cover comprises threads on an inner surface that match corresponding threads on an outer surface of the bonnet, and the cover is configured to enable the handwheel to be rotated in order to actuate the position of the spindle;
   a plurality of pins configured to receive pressure load from the cover;
   a load plate positioned in contact with the plurality of pins and configured to receive the pressure load from the plurality of pins; and
   one or more springs positioned in contact with the load plate and configured to:
   receive the load pressure from the load plate; and
   provide peripheral sealing thrust to the pressure ring.

2. The diaphragm valve assembly of claim 1, further comprising:
   a diaphragm stud mechanically coupled to the compressor and inserted into a center portion of the diaphragm in order to engage the diaphragm when releasing the passage seal based on a reverse thrust from the compressor.

3. The diaphragm valve assembly of claim 2, wherein the center portion of the diaphragm is a raised diaphragm boss and the reduced backing cushion is configured to fit around the diaphragm boss.

4. A diaphragm valve assembly comprising:
   a valve body having an inner wall, a first port defined by a first portion of the inner wall, a second port defined by a second portion of the inner wall, and a controllable flow path defined by a third portion of the inner wall between the first port and the second port;
   a plastic diaphragm positioned over an opening along the third portion of the inner wall, the diaphragm configured to provide a peripheral seal along a periphery of the opening and a passage seal along a diametric weir within the opening;
   a pressure ring in contact with a peripheral surface of the diaphragm configured to provide a pressure load to the diaphragm to provide the peripheral seal;
   a compressor within the pressure ring and in contact with the diaphragm, the compressor configured to selectively engage a center portion of the diaphragm effective to form the passage seal;
   a spindle coupled to the compressor, wherein the spindle is configured to actuate a position of the compressor between a closed position and an open position such that the diaphragm forms the passage seal in the closed position or releases the passage seal in the open position;
   a handwheel configured to actuate a position of the spindle between the open position and the closed position;
   a bonnet to house the pressure ring, the compressor, and the spindle;
   a cover to be fitted over an upper portion of the bonnet and slideably coupled to the handwheel, wherein the cover comprises threads on an inner surface that match corresponding threads on an outer surface of the bonnet, and the cover is configured to enable the handwheel to be rotated in order to actuate the position of the spindle;
   a plurality of pins configured to receive pressure load from the cover;
   a load plate positioned in contact with the plurality of pins and configured to receive the pressure load from the plurality of pins; and
   one or more springs positioned in contact with the load plate and configured to:
   receive the load pressure from the load plate; and
   provide peripheral sealing thrust to the pressure ring.

5. The diaphragm valve assembly of claim 4, further comprising:
   a diaphragm stud mechanically coupled to the compressor and inserted into a diaphragm boss in order to engage the diaphragm when releasing the passage seal based on a reverse thrust from the compressor.

6. The diaphragm valve assembly of claim 4, wherein a pressure capacity of the valve assembly is in a range from about 2300 psi to about 4400 psi.

7. The diaphragm valve assembly of claim 4, wherein the opening is substantially circularly shaped and the diaphragm is substantially rectangularly shaped.

8. A diaphragm valve assembly comprising:
   a valve body having an inner wall, a first port defined by a first portion of the inner wall, a second port defined by a second portion of the inner wall, and a controllable flow path defined by a third portion of the inner wall between the first port and the second port;

a plastic diaphragm positioned over an opening along the third portion of the inner wall, the diaphragm comprising a diaphragm membrane and a diaphragm boss that raises from a center portion of the diaphragm membrane, wherein the diaphragm is configured to provide a peripheral seal along a periphery of the opening and a passage seal along a diametric weir within the opening;

a pressure ring in contact with a peripheral surface of the diaphragm membrane configured to provide a pressure load to the diaphragm membrane to provide the peripheral seal;

a compressor within the pressure ring configured to selectively engage the diaphragm boss effective to form the passage seal;

a diaphragm stud mechanically coupled to the compressor and inserted into the diaphragm boss in order to engage the diaphragm membrane when releasing the passage seal based on a reverse thrust from the compressor;

a spring located between the diaphragm boss and the compressor around the diaphragm stud, the spring configured to provide relative compliance for the height of the diaphragm boss; and a spindle coupled to the compressor, wherein the spindle is configured to actuate a position of the compressor between a closed position and an open position such that the diaphragm membrane forms the passage seal in the closed position or releases the passage seal in the open position.

9. The diaphragm valve assembly of claim 8, further comprising:

a handwheel configured to actuate a position of the spindle between the open position and the closed position; and a bonnet to house the pressure ring, the compressor, and the spindle.

10. The diaphragm valve assembly of claim 9, further comprising:

a cover to be fitted over an upper portion of the bonnet and slideably coupled to the handwheel, wherein the cover comprises threads on an inner surface that match corresponding threads on an outer surface of the bonnet, and the cover is configured to enable the handwheel to be rotated in order to actuate the position of the spindle.

11. The diaphragm valve assembly of claim 10, further comprising:

a plurality of pins configured to receive pressure load from the cover;

a load plate positioned in contact with the plurality of pins and configured to receive the pressure load from the plurality of pins; and one or more springs positioned in contact with the load plate and configured to:
receive the load pressure from the load plate; and
provide peripheral sealing thrust to the pressure ring.

12. The diaphragm valve assembly of claim 8, wherein a pressure capacity of the valve assembly is in a range from about 2300 psi to about 4400 psi.

13. The diaphragm valve assembly of claim 8, wherein the spring is elastomer or metallic.

14. The diaphragm valve assembly of claim 8, wherein the opening is substantially circularly shaped.

* * * * *